United States Patent [19]

Yamashita et al.

[11] Patent Number: 5,506,516
[45] Date of Patent: Apr. 9, 1996

[54] METHOD OF INSPECTING AN ACTIVE MATRIX SUBSTRATE

[75] Inventors: Toshihiro Yamashita, Nara; Yasuhiro Matsushima, Kashihara; Takayuki Shimada, Ikoma; Yutaka Takafuji, Nara, all of Japan

[73] Assignee: Sharp Kabushiki Kaisha, Osaka, Japan

[21] Appl. No.: 300,540

[22] Filed: Sep. 6, 1994

Related U.S. Application Data

[63] Continuation of Ser. No. 903,670, Jun. 24, 1992, abandoned.

[30] Foreign Application Priority Data

Jun. 28, 1991 [JP] Japan .................................. 3-159163

[51] Int. Cl.$^6$ .............................. G01R 31/00; G01R 15/12
[52] U.S. Cl. .......................................... 324/770; 324/753
[58] Field of Search ................................. 324/753, 763, 324/770, 769, 768, 540

[56] References Cited

U.S. PATENT DOCUMENTS

| | | | |
|---|---|---|---|
| 4,841,233 | 6/1989 | Yoshida | 324/158 |
| 5,113,134 | 5/1992 | Plus et al. | 324/158 R |
| 5,184,082 | 2/1993 | Nelson | 324/158 R |
| 5,235,272 | 8/1993 | Henley | 324/158 R |
| 5,262,720 | 11/1993 | Senn et al. | 324/158 R |
| 5,285,150 | 2/1994 | Henley et al. | 324/770 |

FOREIGN PATENT DOCUMENTS

| | | |
|---|---|---|
| 0290066 | 9/1988 | European Pat. Off. . |
| 0376165 | 4/1990 | European Pat. Off. . |
| 57-38498 | 3/1982 | Japan . |
| 60-2989 | 1/1985 | Japan . |

*Primary Examiner*—Kenneth A. Wieder
*Assistant Examiner*—Barry C. Bowser
*Attorney, Agent, or Firm*—Nixon & Vanderhye

[57] ABSTRACT

In a method of inspecting an active matrix substrate of the invention, the active matrix substrate includes a pixel portion having a plurality of pixels arranged in a matrix, a plurality of scanning lines and data lines for driving the pixel portion, and a drive circuit having one and more video lines, one end of each of the plurality of data lines being connected to one of the video lines. The method of the invention includes the steps of: providing one or more inspecting lines, the other end of each of the plurality of data lines being connected to one of the inspecting lines; applying an inspecting signal to each of the inspecting lines, with the drive circuit being in operation; and inspecting the drive circuit and the plurality of data lines, based on at least one of the signals output from the or each of the video lines in accordance with the inspecting signals.

14 Claims, 15 Drawing Sheets

METHOD OF INSPECTING AN ACTIVE MATRIX SUBSTRATE

This is a continuation of application Ser. No. 07/903,670, filed Jun. 24, 1992, now abandoned.

BACKGROUND OF THE INVENTION

1. Field of the Invention

The present invention relates to a method of inspecting an active matrix substrate including driving circuits for a liquid crystal display apparatus or the like.

2. Description of the Prior Art

In recent years, an active matrix substrate for a liquid crystal display apparatus has become greatly miniaturized and fabricated with high accuracy. In some cases, thin-film-transistors (TFTs) in a pixel portion, a scanning line driving circuit and a data line driving circuit are formed on one substrate. The provision of driving circuits in an active matrix substrate has advantages over a case where the driving circuits are externally mounted. The advantages are that lower production cost can be realized, that it is possible to correspond to fine pitches, and that the panel module size can be made smaller. By making use of these advantages, a liquid crystal display apparatus in which an active matrix substrate includes driving circuits having a size of about 1 inch (2.54 cm) has been commercially available for a view finder.

Generally, driving circuits included in an active matrix substrate are required to operate at a high speed. For example, in the National Television System Committee (NTSC) system, a scanning line driving circuit is required to operate at 15.75 kHz, and a data line driving circuit at a few megahertz. Therefore, polysilicon having higher mobility than amorphous silicon is used for TFTs which form part of a driving circuit. FIG. 21 is a block diagram showing a conventional liquid crystal display apparatus using polysilicon TFTs. The liquid crystal display apparatus comprises a pixel portion 11, a data line driving circuit 12, a scanning line driving circuit 13, a common line 11b for the connection to a counter electrode (not shown), video lines 12a, analog switches 12b, and a shift register 12c.

An exemplary method of fabricating such an active matrix substrate is described below. A thin polysilicon film with a thickness of about 1000 Å (100 nm) is first formed on a quartz glass substrate by low pressure chemical vapor deposition (CVD). Next, Si ions are injected into the thin polysilicon film, so that the thin polysilicon film is made to be amorphous. The thin amorphous polysilicon film is heat-treated in a nitrogen atmosphere at a temperature of 600° C., for example, for about 100 hours, so as to obtain a thin polysilicon film. The thin polysilicon film is patterned to form TFT channel layers and lower electrodes for additional storage capacitors. The resistance of the lower electrodes is reduced by injecting P ions. Thereafter, an $SiO_2$ gate insulating film with a thickness of about 1000 Å (100 nm) is formed by low pressure CVD at a temperature of about 850° C. On the entire surface of the $SiO_2$ gate insulating film, a polysilicon film with a thickness of about 5000 Å (500 nm) is formed by low pressure CVD. The resistance of the polysilicon film is reduced by diffusion, after $N^+$ polysilicon is deposited at a temperature of about 850° C. Then, the polysilicon film is patterned to form gate electrodes, scanning lines, and upper electrodes for the additional storage capacitors and wiring thereof. After forming $N^+$ source and drain regions by injecting P ions, an $SiO_2$ layer-insulating film is deposited to have a thickness of 7000 Å (700 nm) by atmospheric pressure CVD. Then, contact holes are formed, and Al is deposited by sputtering. Patterning is performed to form data lines. Next, after an SiO insulating film is deposited entirely on the top surface of the substrate on which patterns have been formed by plasma CVD, through-holes are formed for the contact of pixel electrodes with the drain. Indium-tin-oxide (ITO) is deposited to have a thickness of 1000 Å (100 nm) by sputtering, and then patterning is performed to form pixel electrodes. In the above processes, CMOS peripheral circuits such as a scanning line driving circuit and a data line driving circuit are formed at the same time.

A liquid crystal display apparatus is assembled by using the thus fabricated active matrix substrate and a counter substrate which are positioned opposite to each other with a liquid crystal layer interposed therebetween. After the liquid crystal display apparatus is assembled and can actually be driven, the active matrix substrate can easily be inspected optically. However, if the active matrix substrate in the assembly is proved to have a fault, it is very difficult to correct the fault in a small-sized panel. Furthermore, the assembling process of the active matrix substrate with the counter substrate is in vain. Therefore, it is required to inspect the active matrix substrate after TFTs, etc. are formed.

To meet this requirement, in a conventional method of inspecting an active matrix substrate, needle-like probes are directly brought into contact with signal lines and the conductive conditions between signal lines are checked. Alternatively, there has been a non-contact inspection method or an inspection method in which an inspecting circuit is provided on the substrate. Examples of such conventional inspection methods are disclosed in Japanese Laid-Open Patent Publication Nos. 57-38498 and 60-2989.

However, by the inspection method in which needle-like probes are directly brought into contact, a problem has occurred that, since each pixel portion of an active matrix substrate fabricated in small size and with high accuracy is minute in size, there is an increase in probability that pixels are damaged or that another breakage of line will occur as a result of the inspection. By the non-contact inspection method, a problem has occurred that, since portions to be inspected are large in number and minute in size, it is not always easy to reliably inspect all the portions at a high speed. By the inspection method in which an inspection circuit is provided on the substrate, a problem has occurred that, since the inspection circuit itself may have a fault due to a faulty transistor or the like for connection, the inspection cannot be reliably performed.

SUMMARY OF THE INVENTION

In a method of inspecting an active matrix substrate in accordance with the invention, the active matrix substrate being of the type which includes a pixel portion having a plurality of pixels arranged in a matrix, a plurality of scanning lines and data lines for driving the pixel portion, and a drive circuit having one or more video lines, one end of each of the plurality of data lines being connected to one of the video lines, the method comprises the steps of: providing one or more inspecting lines, the other end of each of the plurality of data lines being connected to one of the inspecting lines; applying an inspecting signal to each of the inspecting lines, with the drive circuit being in operation; and inspecting the drive circuit and the plurality of data lines, based on at least one of the signals output from the or each of the video lines in accordance with the inspecting signals.

In another embodiment of the invention, a method of inspecting an active matrix substrate of the type including a pixel portion having a plurality of pixels arranged in a matrix, and a plurality of scanning lines and data lines for driving the pixel portion, one end of each of the plurality of scanning lines being connected to a drive circuit, comprises the steps of: providing one or more inspecting lines, the other end of each of the plurality of scanning lines being connected to one of the inspecting lines; applying a scanning pulse to each of the plurality of scanning lines by operating the drive circuit; and inspecting the drive circuit and the plurality of scanning lines, based on at least one of the signals output from the or each of the inspecting lines in accordance with the scanning pulses.

Thus, the invention described herein makes possible the advantage of providing a method of inspecting an active matrix substrate by which an active matrix substrate can easily and reliably be inspected.

These and other advantages of the present invention will become apparent to those skilled in the art upon reading and understanding the following detailed description with reference to the accompanying figures.

DESCRIPTION OF THE PREFERRED EMBODIMENTS

Example 1

Figure 1:
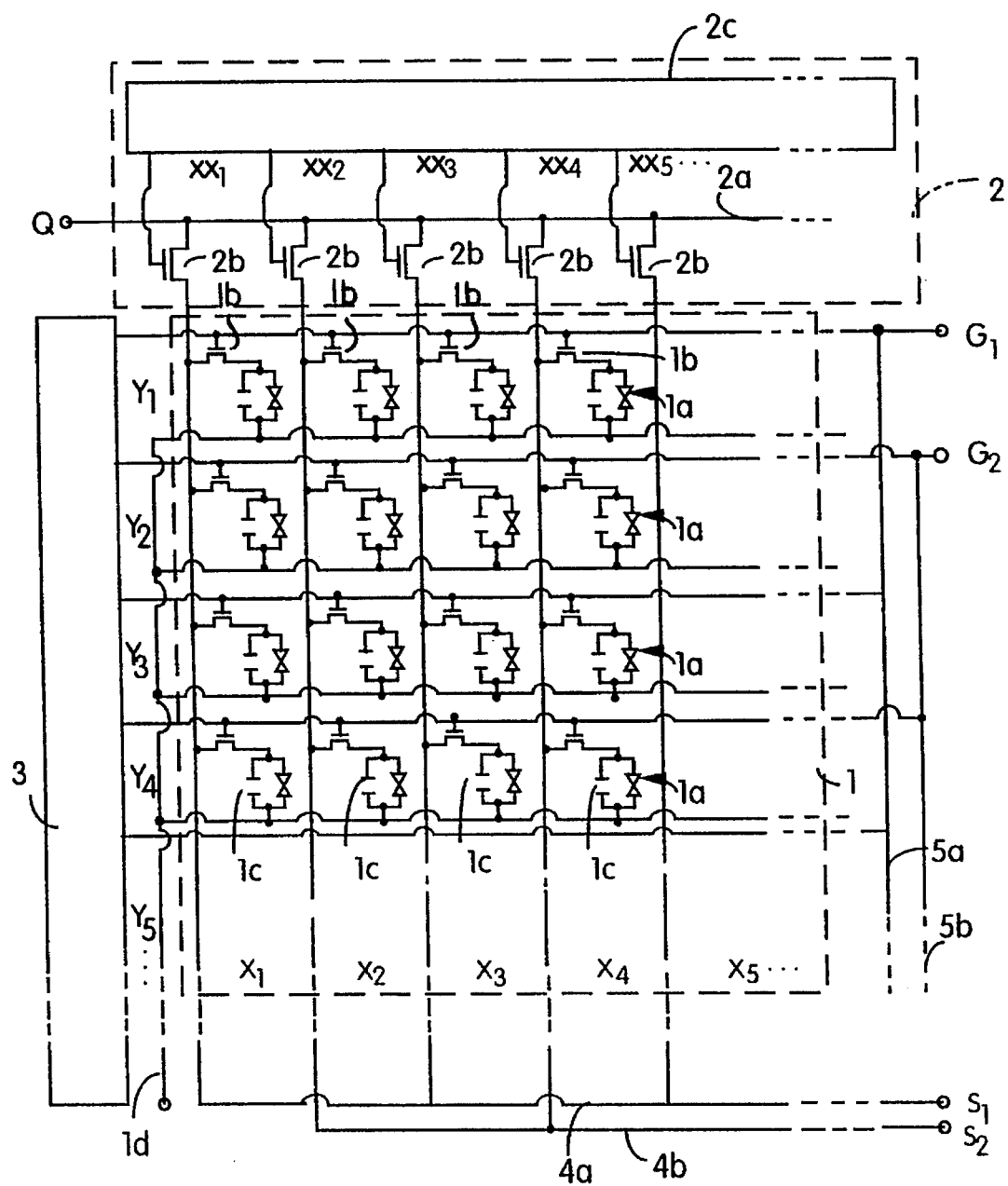
FIG. 1 is a block diagram showing an active matrix substrate in Example 1 of the invention.

FIG. 1 shows an active matrix substrate to be inspected in Example 1. The active matrix substrate includes a pixel portion 1, a data line driving circuit 2 and a scanning line driving circuit 3 which are formed on the substrate. In the pixel portion 1, there are a plurality of pixel electrodes of pixels 1a in an active matrix substrate, and a plurality of TFTs 1b for controlling the application of a voltage to the respective pixel electrodes. The plurality of TFTs 1b arranged in a matrix are connected to the crossing points of a plurality of data lines $X_j$ (j=1, 2, 3, ... ) and a plurality of scanning lines $Y_i$ (i=1, 2, 3, ... ). A common line 1d is provided for the connection to a counter electrode (not shown) and 1c is an additional storage capacitance.

The data line driving circuit 2 is a circuit for controlling the electric connection of at least one of the data lines $X_j$ in the pixel portion 1 to a video line 2a according to a predetermined timing. Specifically, each of the data lines $X_j$ is connected to the video line 2a via a corresponding analog switch 2b. The analog switches 2b are sequentially turned on, based on an output signal of a shift register 2c, whereby the corresponding data lines $X_j$ are sequentially electrically connected to the video line 2a. At one end of the video line 2a, a video signal input terminal Q is provided.

The scanning line driving circuit 3 is a circuit for outputting a scanning signal to each of the scanning lines $Y_i$. Specifically, the output terminals of the scanning line driving circuit 3 constituted by a shift register are connected to the respective scanning lines $Y_i$. This means that the scanning signals are sequentially output to the corresponding scanning lines $Y_i$. When a scanning signal is output to one of the scanning lines $Y_i$, all the TFTs 1b connected to the scanning line $Y_i$ on the pixel portion 1 are turned on. As a result, the pixel electrodes of the pixels 1a connected to the on-state TFTs 1b are electrically connected to the corresponding data lines $X_j$ connected to the on-state TFTs 1b, respectively. One of the scanning lines $Y_i$ is sequentially selected by the scanning line driving circuit 3, and the data line driving circuit 2 sends a video signal to each of the data lines $X_j$ corresponding to the selected scanning line $Y_i$ through the video line 2a, thereby performing an active display operation of a liquid crystal display apparatus.

At one end of the data lines $X_j$ of which the other end is connected to the data line driving circuit 2, two data signal inspecting lines 4a and 4b are formed. The data lines $X_j$ are alternately connected to the data signal inspecting lines 4a and 4b. At ends of the data signal inspecting lines 4a and 4b, inspecting signal input terminals $S_1$ and $S_2$ are provided, respectively. At one end of the scanning lines $Y_i$ of which the other end is connected to the scanning line driving circuit 3, two scanning signal inspecting lines 5a and 5b are formed. The scanning lines $Y_i$ are alternately connected to the scanning signal inspecting lines 5a and 5b. At the ends of the scanning signal inspecting lines 5a and 5b, inspecting signal output terminals $G_1$ and $G_2$ are provided, respectively.

Figure 2:
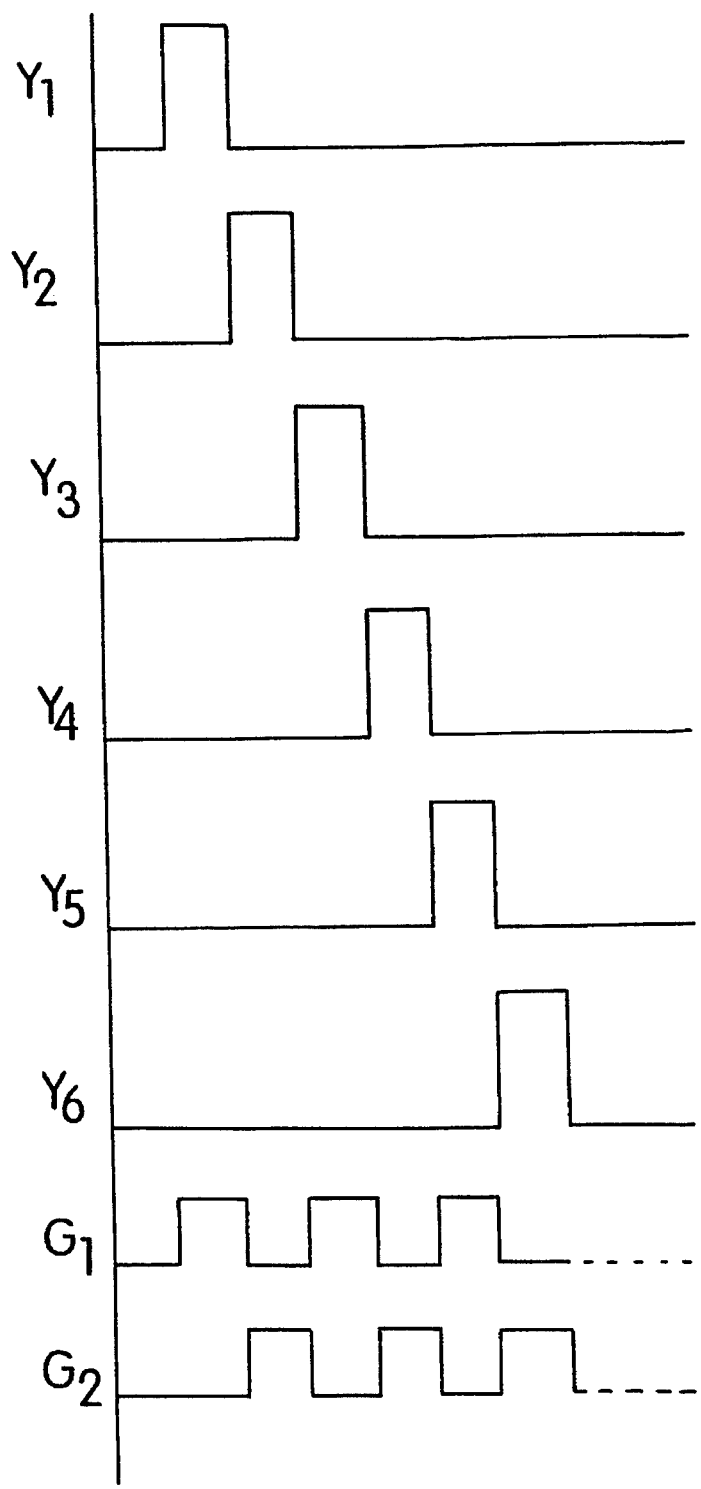
FIG. 2 is a time chart illustrating scanning signals output from a scanning line driving circuit to scanning lines, and output signals from inspecting lines during inspection in Example 1 of the invention.

When inspecting the scanning signal, the outputs from the inspecting signal output terminals $G_1$ and $G_2$ are monitored under the condition that the scanning lane driving circuit 3 is operating. FIG. 2 shows waveforms of scanning signals sequentially output onto the scanning lines $Y_i$, and waveforms of signals output at the inspecting signal output terminals $G_1$ and $G_2$. In a case where the scanning line driving circuit 3 properly outputs scanning signals and no breakage or leakage occurs on the scanning lines $Y_i$, pulse-like inspecting signals are alternately output from the inspecting signal output terminals $G_1$ and $G_2$, as shown in FIG. 2. In such a case, the voltage output from the inspecting signal output terminals $G_1$ and $G_2$ is extremely small, but the voltage is sufficient to be detected. For example, the voltage of the scanning signal from the scanning line driving circuit 3 is assumed to be 15 V, the voltages output from the inspecting signal output terminals $G_1$ and $G_2$ are about 50 mV (in a case where 480 scanning lines are provided).

Figure 3:
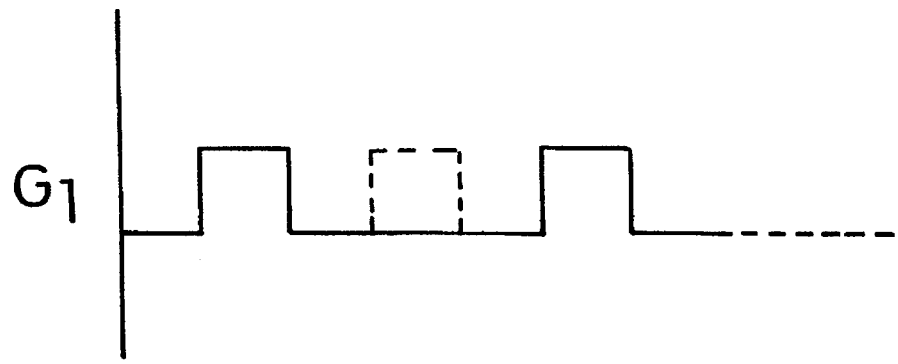
FIG. 3 is a time chart illustrating an output signal from the inspecting line, when a breakage of a scanning line occurs in FIG. 2 in Example 1 of the invention.
Figure 4:
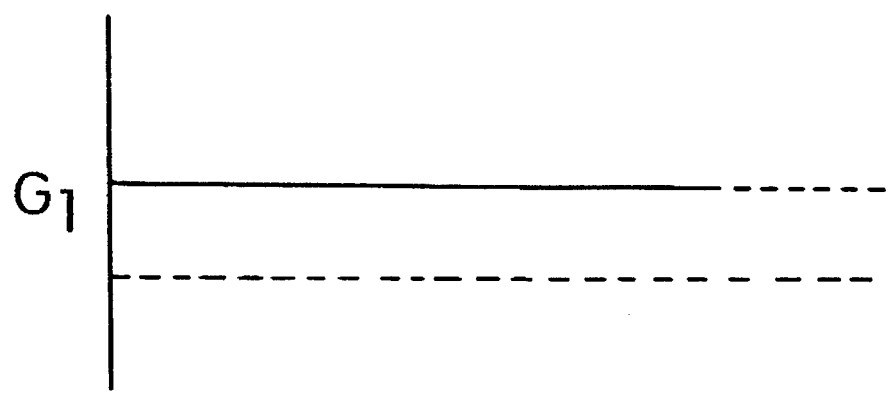
FIG. 4 is a time chart illustrating an output signal from the inspecting line, when a fault occurs in FIG. 2 in Example 1 of the invention.

On the other hand, when a breakage of scanning line $Y_3$ occurs, for example, an inspecting signal having an abnormal waveform shown in FIG. 3 is output from the inspecting signal output terminal $G_1$. In another case where fault of the scanning line driving circuit 3 causes the scanning line $Y_3$ to be always at a High level, the inspecting signal output from the inspecting signal output terminal $G_1$ becomes always at a High level, as shown in FIG. 4, and proved to be abnormal. As described above, by monitoring the inspecting signals from the inspecting signal output terminals $G_1$ and $G_2$, a fault of the scanning line $Y_i$ and the scanning line driving circuit 3 can be detected.

Figure 5:
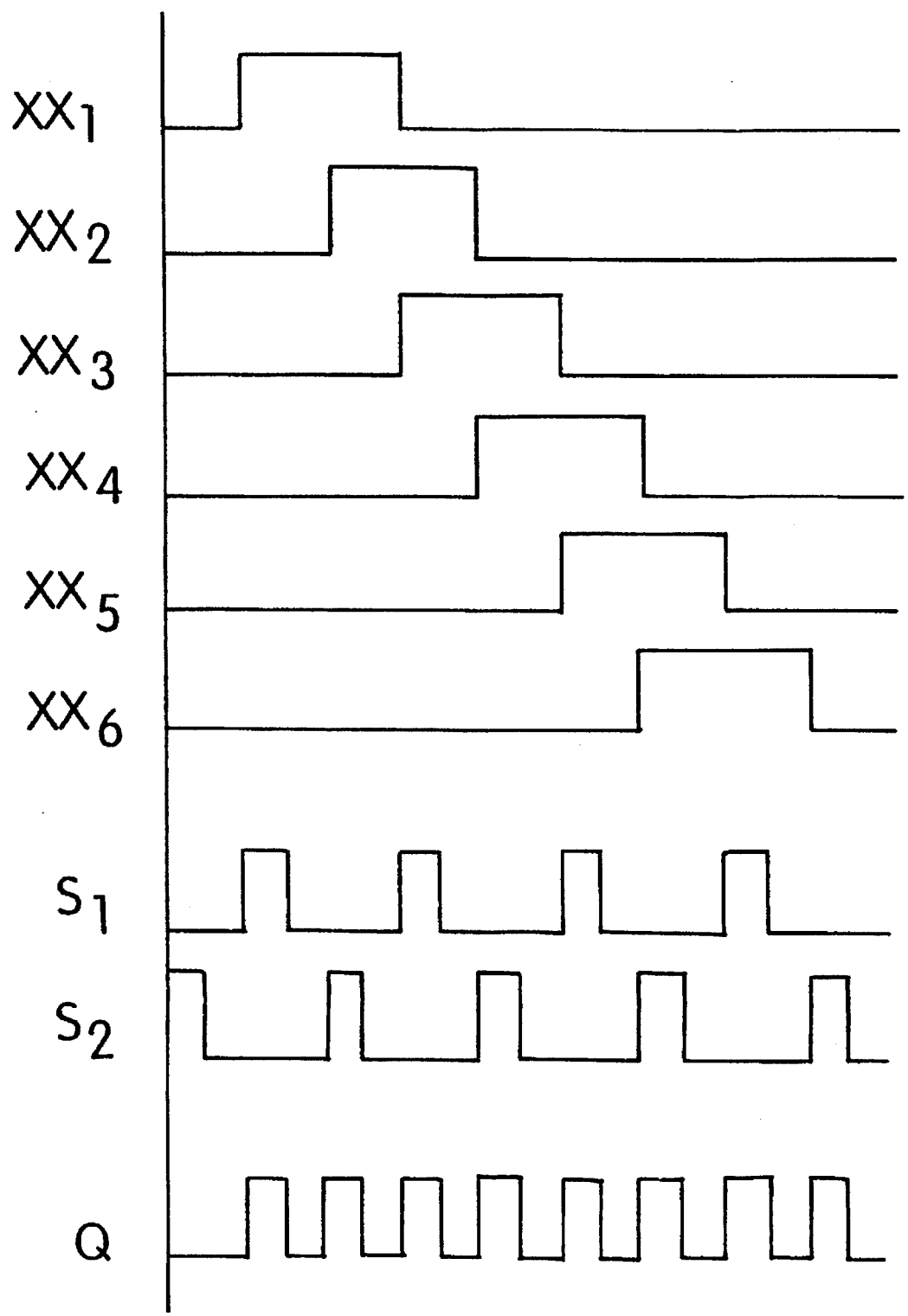
FIG. 5 is a time chart illustrating signals output from a data line driving circuit to analog switches, inspecting signals input to inspecting lines, and an output signal from a video line.
Figure 6:
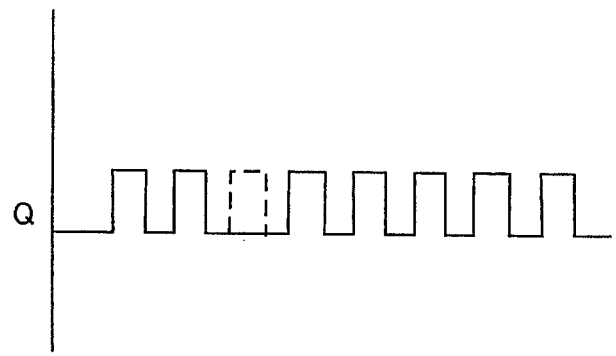
FIG. 6 is a time chart illustrating an output signal from the video line when a fault occurs in FIG. 5 in Example 1 of the invention.

FIG. 5 shows waveforms of signals output from the respective terminals $XX_j$ of the shift register 2c, waveforms of the inspecting signals input to the inspecting signal input terminals $S_1$ and $S_2$, and a waveform of a signal output from the video signal input terminal Q. When inspecting data signal, an inspecting signal is input to the inspecting signal input terminals $S_1$ and $S_2$ and the output of the video signal input terminal Q is monitored, under the condition that the data line driving circuit 2 is operating. As shown in FIG. 5, a pulse signal is sequentially output from each of the terminals $XX_j$ of the shift register 2c, and the data lines $X_j$ are sequentially connected to the video line 2a. Pulse-like inspecting signals are alternately input to the inspecting signal input terminals $S_1$ and $S_2$. In a case where the data line driving circuit 2 properly operates and no breakage or leakage occurs on the data lines $X_j$, a pulse-like signal is output from the video signal input terminal Q, as shown in FIG. 5. On the other hand, in a case, for example, where a signal is not properly output from the third terminal $XX_3$ of the shift register 2c, an analog switch 2b controlled by the signal is not turned on. As a result, the output signal from the video signal input terminal Q has an abnormal waveform, as shown in FIG. 6. As described above, by monitoring the output from the video signal input terminal Q, a fault of the data lines $X_j$ and the data lane driving circuit 2 can be detected.

As described above, a fault in an active matrix substrate can easily be detected. When a fault is found in the inspection of the active matrix substrate, the fault is, if possible, corrected by using a laser, or the like. Regarding an active matrix substrate proved to be a good one as a result of the inspection, the active matrix substrate is sent to an assembling process. In the assembling process, a liquid crystal display apparatus is assembled in such a manner that the active matrix substrate is opposite to the counter electrode with a liquid crystal layer interposed therebetween. Then, in a cutting process, the data signal inspecting lines 4a and 4b are cut from the data lines $X_j$, so that the data signal inspecting lines 4a and 4b are removed. Also, the scanning signal inspecting lines 5a and 5b are cut from the scanning lines $Y_i$, so that the scanning signal inspecting lines 5a and 5b are removed.

Example 2

Figure 7:
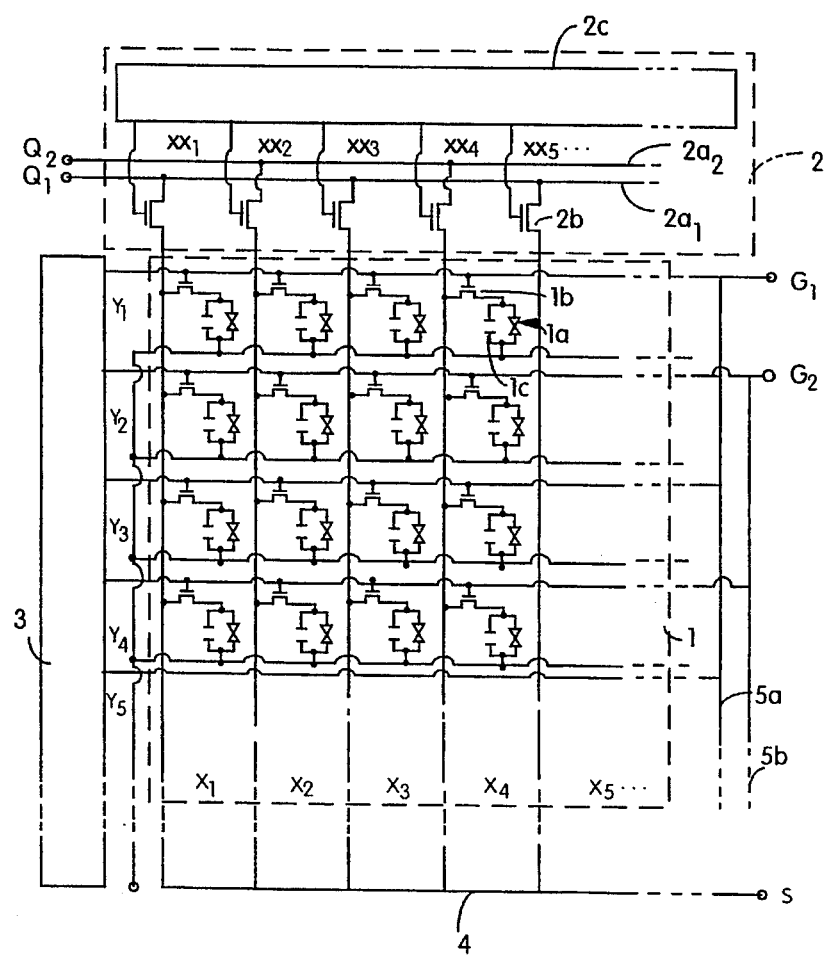
FIG. 7 is a block diagram showing an active matrix substrate in Example 2 of the invention.

Example 2 of the invention will be described with reference to FIGS. 7 to 9. In this example, two video lines $2a_1$ and $2a_2$ are provided on an active matrix substrate, as shown in FIG. 7. Data lines $X_j$ are connected to a data signal inspecting line 4 in common. Under the condition that a data line driving circuit 2 is operating, an inspecting signal is input to an inspecting signal input terminal S, and then outputs from video signal input terminals $Q_1$ and $Q_2$ of the video lines $2a_1$ and $2a_2$.

Figure 8:
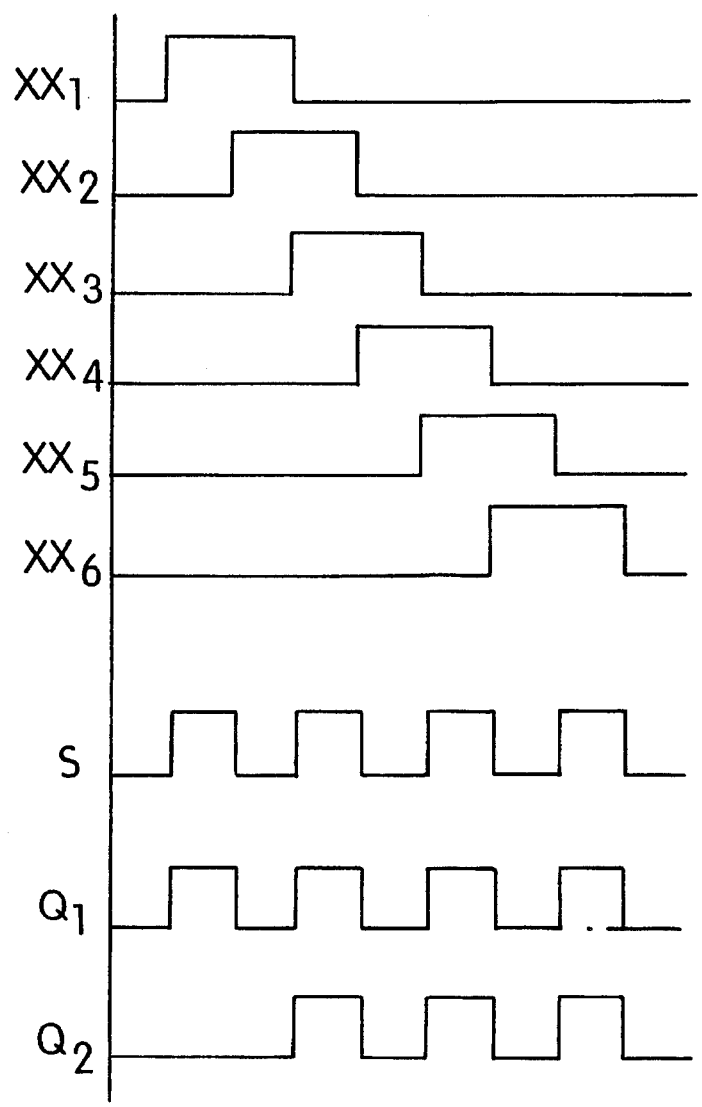
FIG. 8 is a time chart illustrating signals output from a data line driving circuit to analog switches, an inspecting signal input to an inspecting line, and output signals from video lines, during inspection, in Example 2 of the invention.
Figure 9:
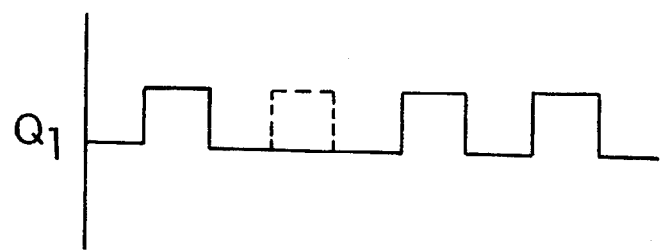
FIG. 9 is a time chart illustrating an output signal from the video line when a fault occurs in FIG. 8 in Example 2 of the invention.

As shown in FIG. 8, a pulse signal is sequentially output from each of the terminals $XX_j$ of a shift register 2c, and a pulse-like inspecting signal is input to the inspecting signal input terminal S. In a case where the data line driving circuit 2 properly operates and no breakage or leakage occurs on the data lines $X_j$, pulse signals are output from the video signal input terminals $Q_1$ and $Q_2$, as shown in FIG. 8. On the other hand, in a case, for example, where a signal is not properly output from the third terminal $XX_3$ of the shift register 2c, where the corresponding analog switch 2b is not turned on, or where a breakage of the data line $X_3$ occurs, the output signal of the video signal input terminal $Q_1$ has an abnormal waveform, as shown in FIG. 9.

In this example, two video signal lines $2a_1$ and $2a_2$ are provided, so that the adjacent data lines $X_j$ can reliably and separately be inspected by a single data signal inspecting line 4. In Example 2 and examples described below, the inspection of scanning signal can be performed in the same manner as in Example 1.

Example 3

Figure 10:
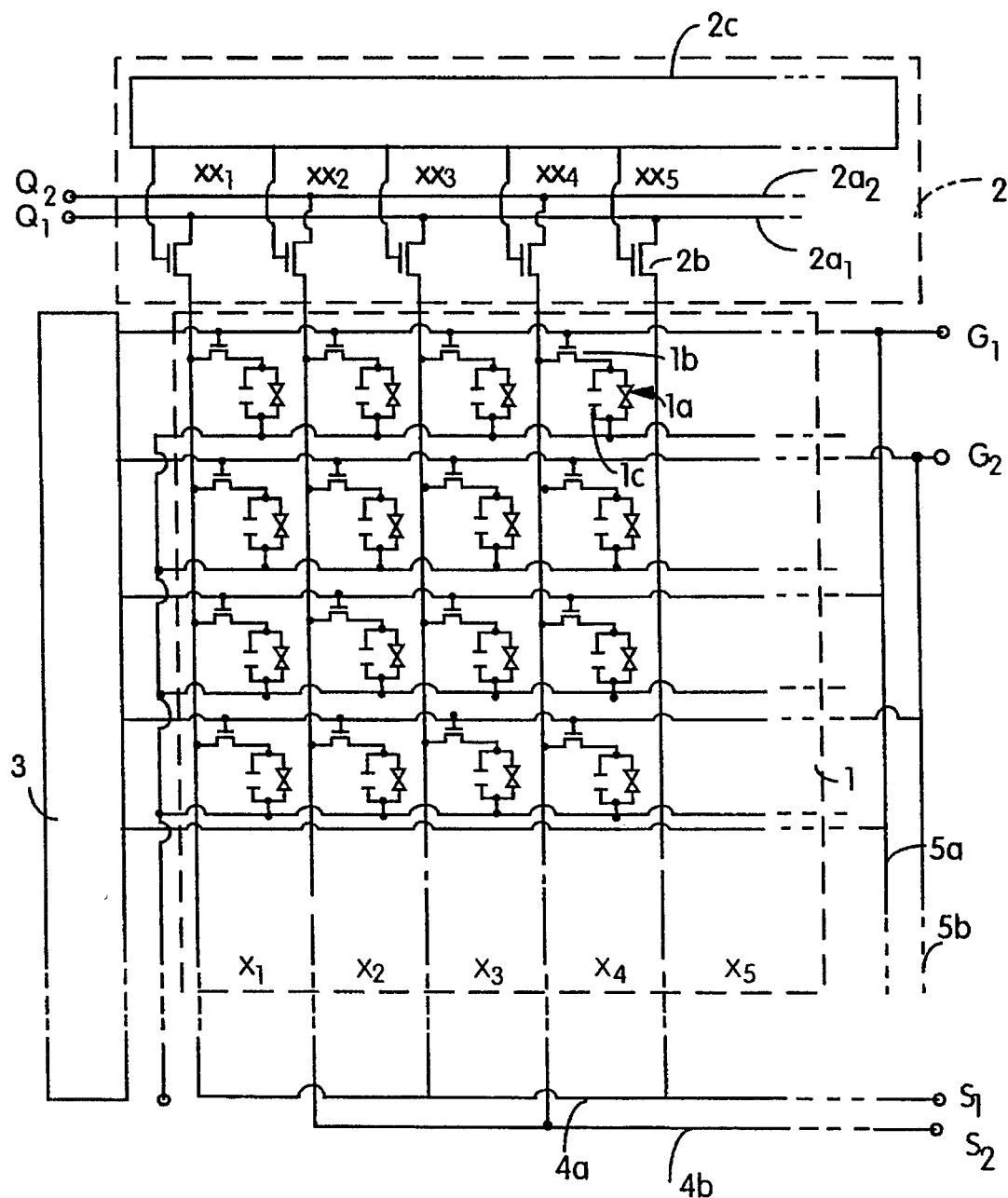
FIG. 10 is a block diagram showing an active matrix substrate in Example 3 of the invention.

Example 3 of the invention will be described with reference to FIGS. 10 to 12. In this example, two video lines $2a_1$ and $2a_2$ are provided on an active matrix substrate. As in Example 1, data lanes $X_j$ are alternately connected to two data signal inspecting lines 4a and 4b.

Figure 11:
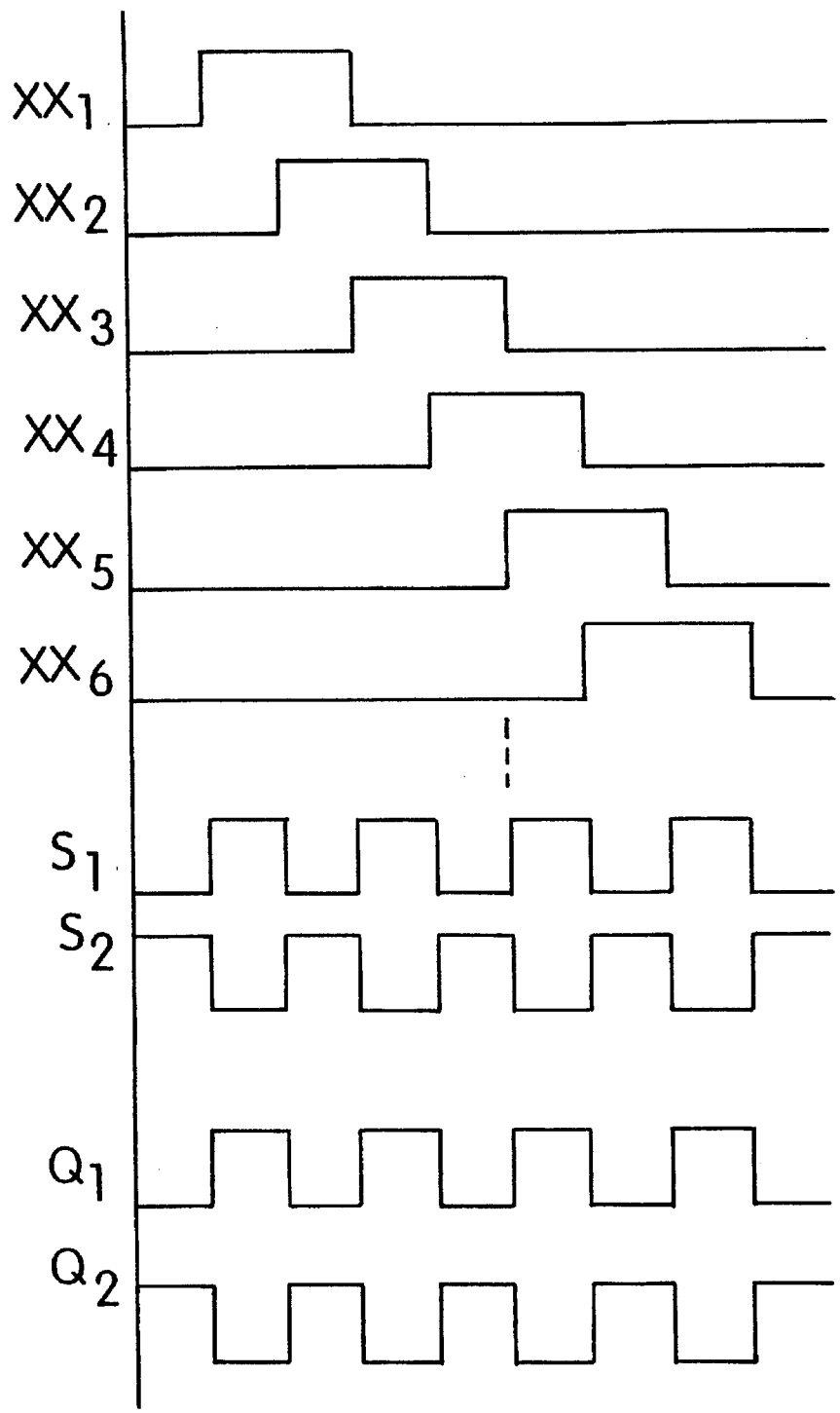
FIG. 11 is a time chart illustrating signals output from a data line driving circuit to analog switches, inspecting signals input to inspecting lines, and output signal from video lines, in Example 3 of the invention.
Figure 12:
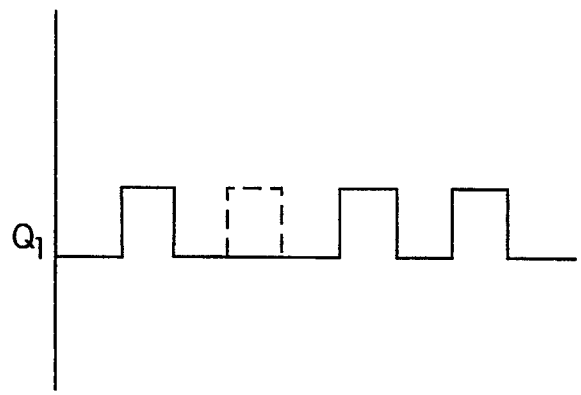
FIG. 12 is a time chart illustrating an output signal from the video line when a fault occurs in FIG. 11 in Example 3 of the invention.

As shown in FIG. 11, under the condition that a data line driving circuit 2 is operating, inspecting pulse signals are respectively input to two inspecting signal input terminals $S_1$ and $S_2$. In a case where the data line driving circuit 2 properly operates and no breakage or leakage occurs on the data lines $X_j$, pulse signals having alternate waveforms are output from video signal input terminals $Q_1$ and $Q_2$, as shown in FIG. 11. In another case, for example, where a signal is not properly output from the terminal $XX_3$ of the shift register 2c, where the corresponding analog switch 2b is not turned on, or where a breakage of the data line $X_3$ occurs, a signal output from the video signal input terminal $Q_1$ has an abnormal waveform, as is shown in FIG. 12.

Accordingly, in this example, the adjacent data lines $X_j$ can reliably and separately be inspected.

Example 4

Figure 13:
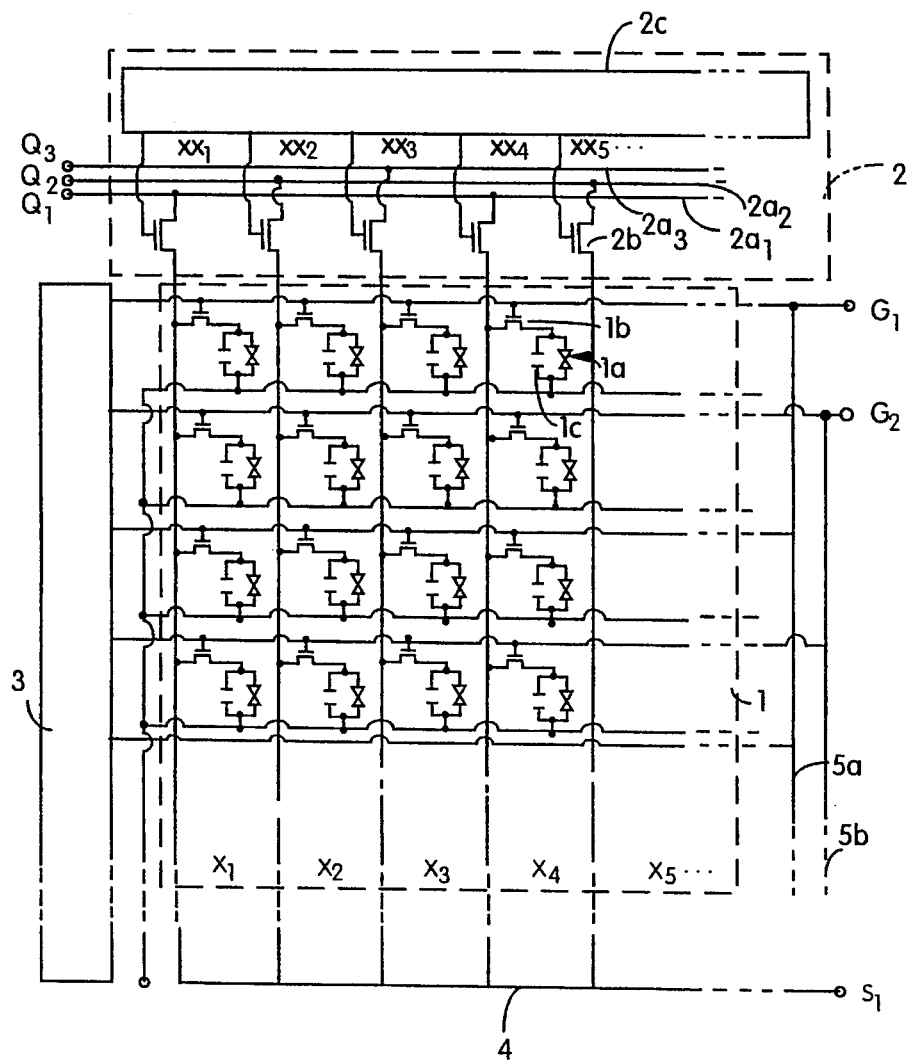
FIG. 13 is a block diagram showing an active matrix substrate in Example 4 of the invention.

Example 4 of the invention will be described with reference to FIGS. 13 to 16. In this example, as shown in FIG. 13, three video lines $2a_1$, $2a_2$, and $2a_3$ are provided on an active matrix substrate. As in Example 2, data lines $X_j$ are connected to a data signal inspecting line 4 in common.

Figure 14:
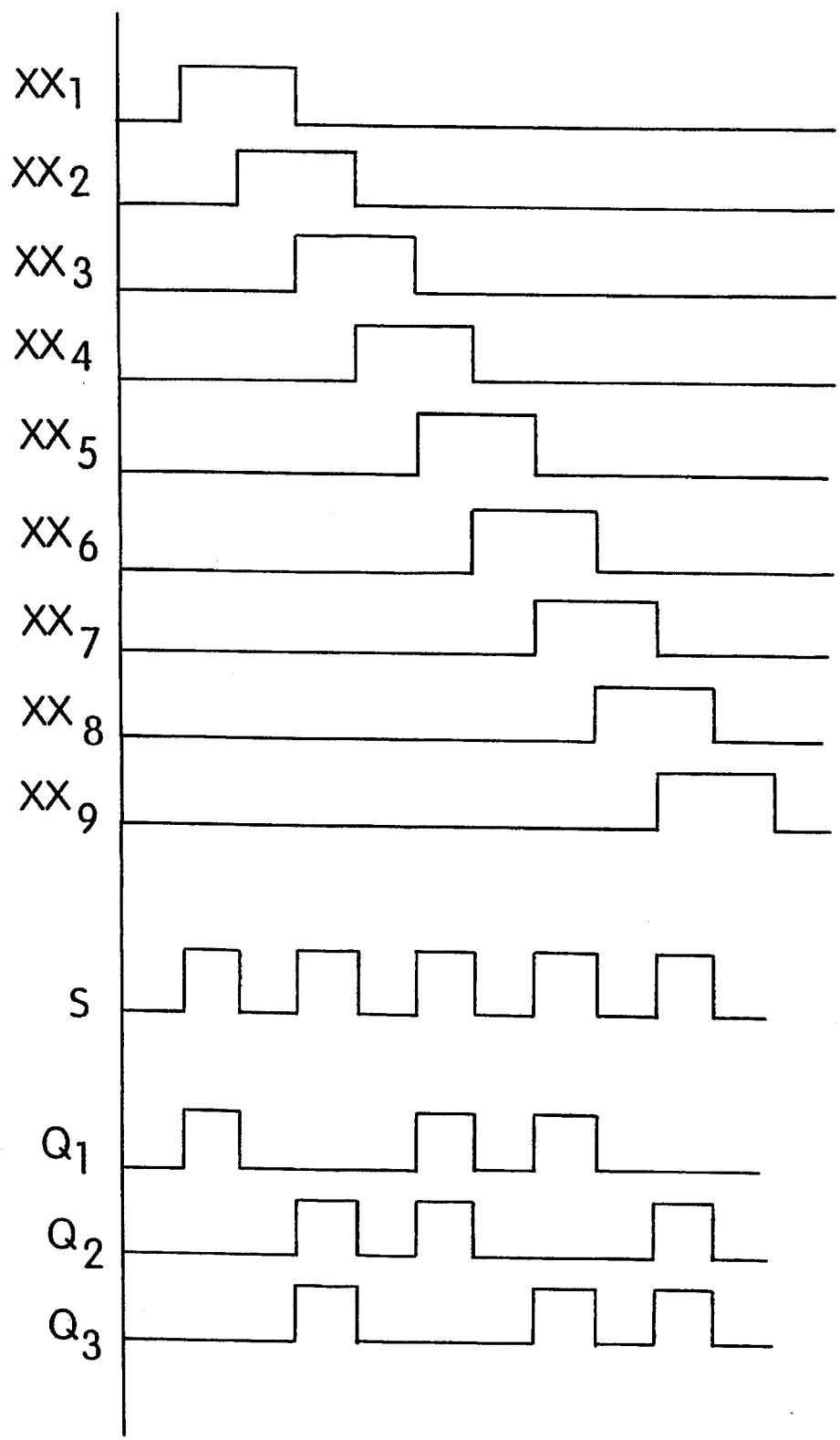
FIG. 14 is a time chart illustrating signals output from a data line driving circuit to analog switches, an inspecting signal input to an inspecting line, and output signals from video lines, during inspection, in Example 4 of the invention.
Figure 15:
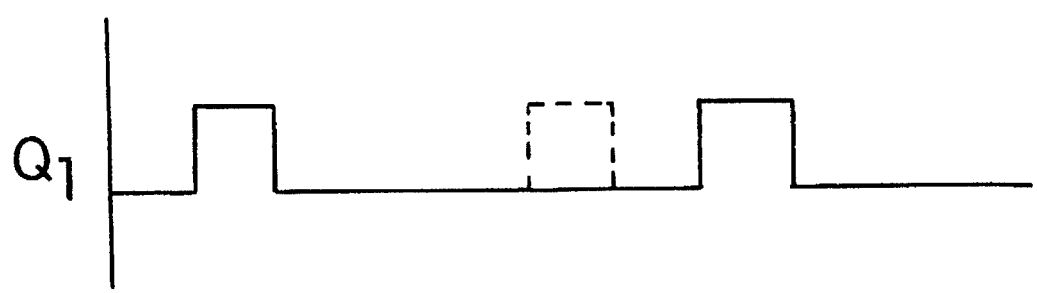
FIG. 15 is a time chart illustrating an output signal from the video line when a fault occurs in FIG. 14 in Example 4 of the invention.
Figure 16:
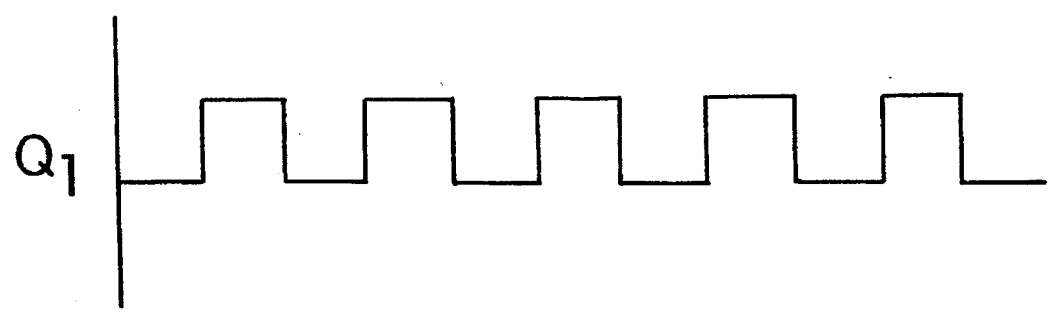
FIG. 16 is a time chart illustrating an output signal from the video line when another fault occurs in FIG. 14 in Example 4 of the invention.

As shown in FIG. 14, under the condition that a data line driving circuit 2 is operating, an inspecting pulse signal is input to an inspecting signal input terminal S. In a case where the data line driving circuit 2 properly operates and no breakage or leakage occurs on the data lines $X_j$, pulse signals, as shown in FIG. 14, are respectively output from three video signal input terminals $Q_1$, $Q_2$, and $Q_3$. In another case, for example, where a signal is not properly output from the fourth terminal $XX_4$ of a shift register 2c, where the corresponding analog switch 2b is not turned on, or where a breakage of the data line $X_4$ occurs, a signal output from the video signal input terminal $Q_1$ has an abnormal waveform, as shown in FIG. 15. When a signal output from the fourth terminal $XX_4$ of the shift register 2c is always at a High level, or when the fourth analog switch 2b is always in the on state, the waveform of the output signal of the video signal input terminal $Q_1$ is the same as that of the inspecting signal input to the inspecting signal input terminal S, as shown in FIG. 16, and proved to be abnormal.

Accordingly, in this example, the adjacent data lines $X_j$ can reliably and separately be inspected.

Example 5

Figure 17:
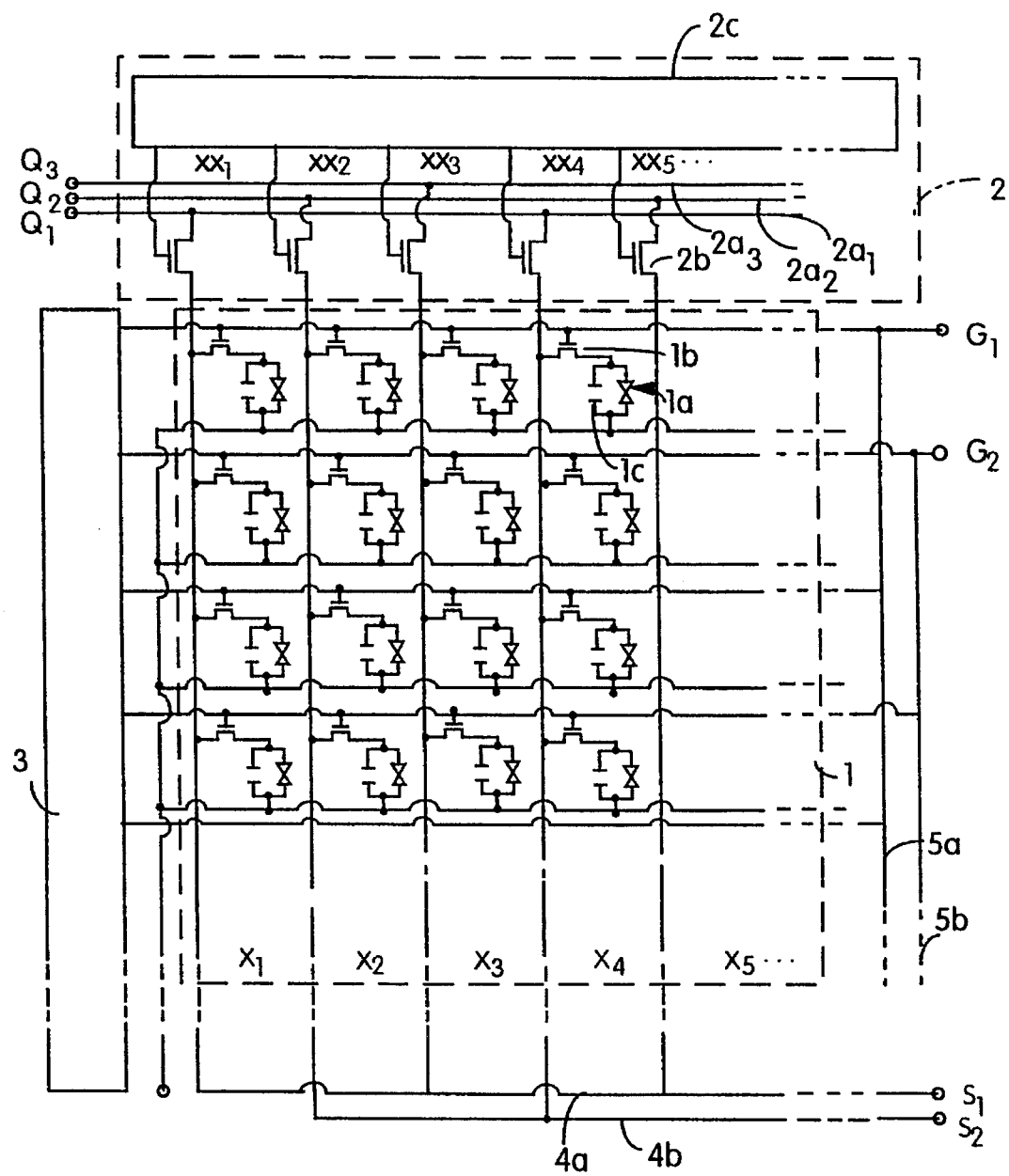
FIG. 17 is a block diagram showing an active matrix substrate in Example 5 of the invention.

Example 5 of the invention will be described with reference to FIGS. 17 to 20. In this example, three video lines $2a_1$, $2a_2$, and $2a_3$ are provided on an active matrix substrate, as shown in FIG. 17. As in Example 1, data lines $X_j$ are alternately connected to two data signal inspecting lines 4a and 4b.

Figure 18:
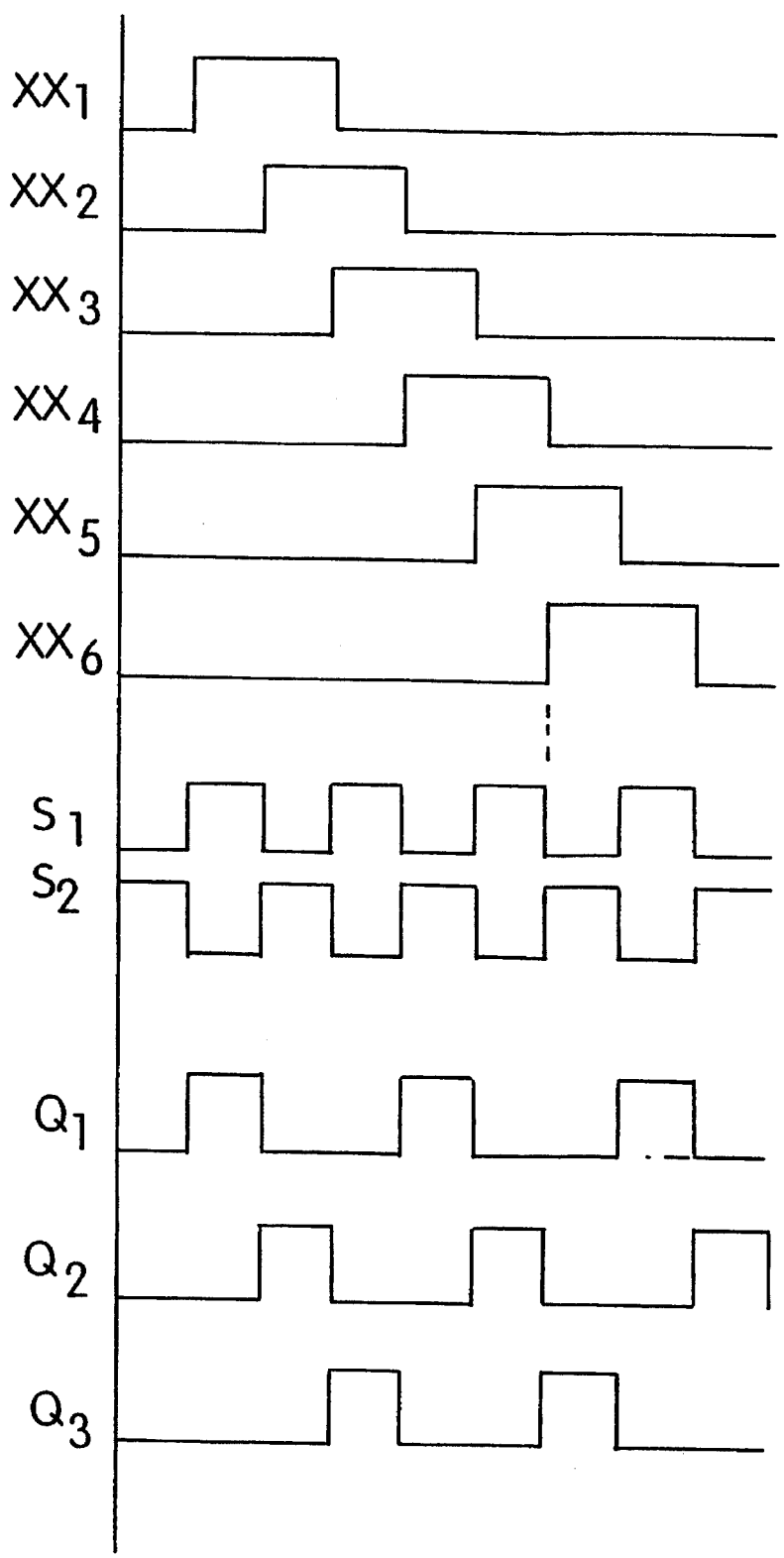
FIG. 18 is a time chart illustrating signals output from a data line driving circuit to analog switches, inspecting signals input to inspecting lines, and output signals from video lines, during inspection in Example 5 of the invention.
Figure 19:
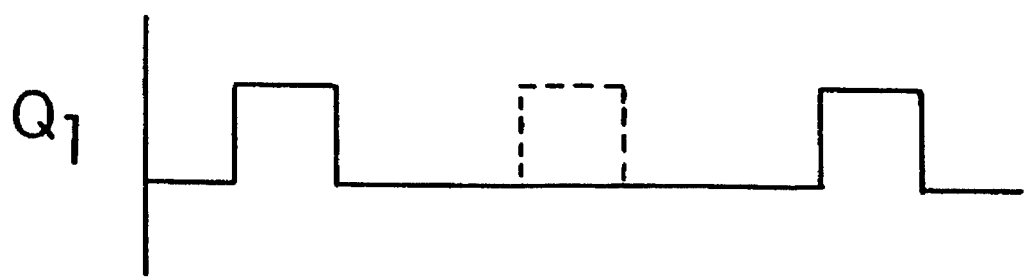
FIG. 19 is a time chart illustrating an output signal from the video line when a fault occurs in FIG. 18 in Example 5 of the invention.
Figure 20:
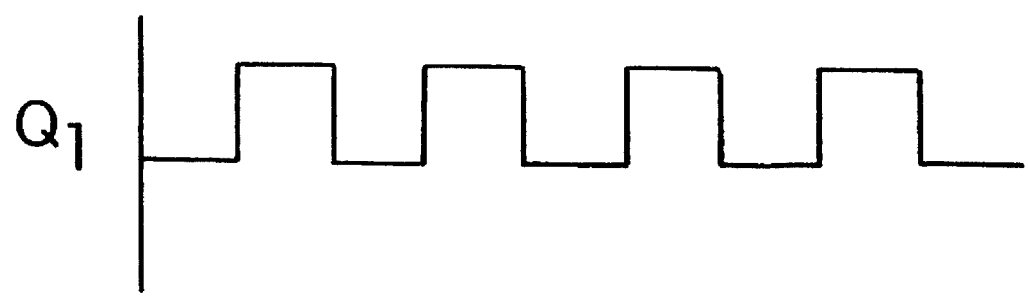
FIG. 20 is a time chart illustrating an output signal from the video line when another fault occurs in FIG. 18 in Example 5 of the invention.
Figure 21:
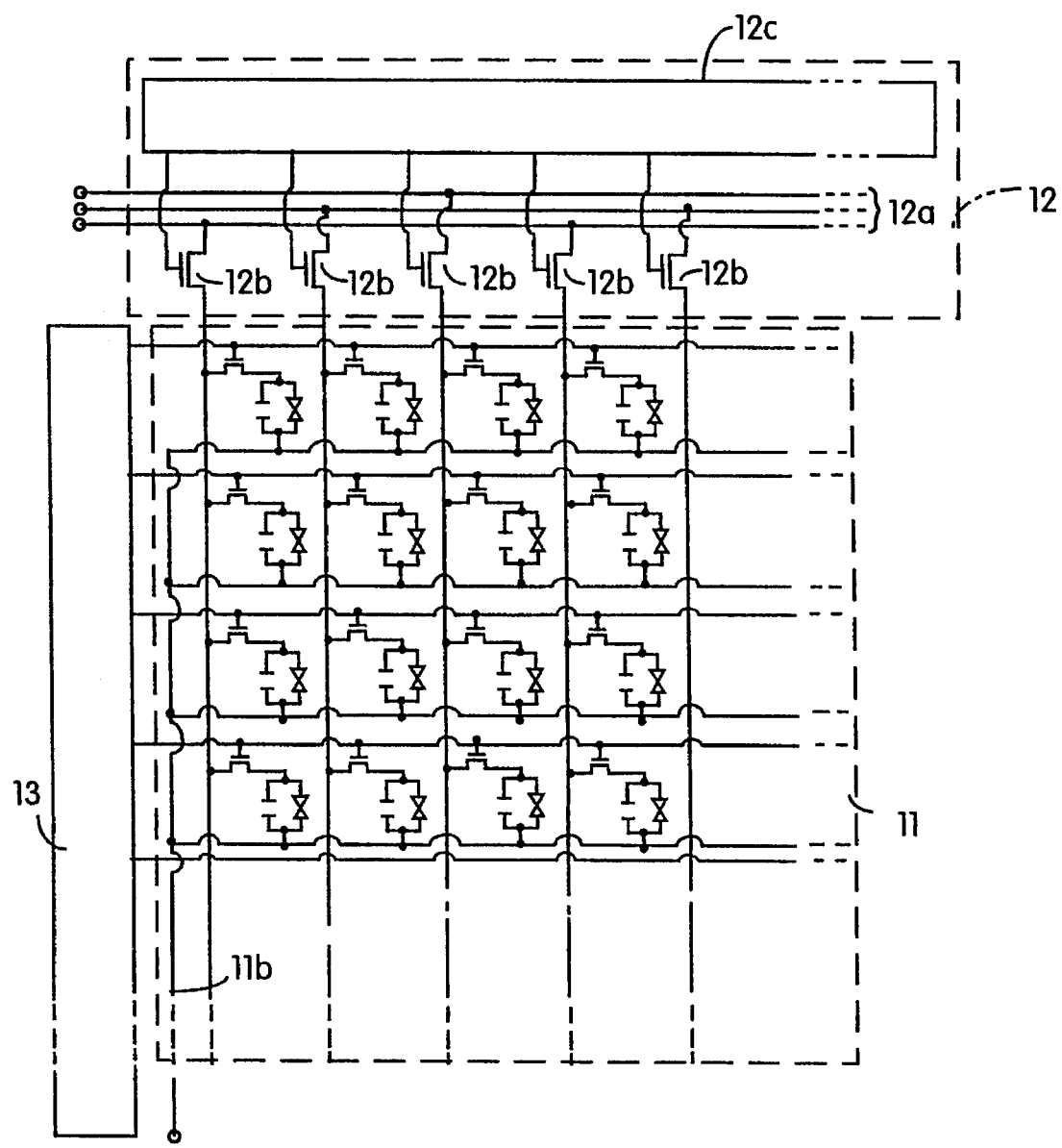
FIG. 21 is a block diagram showing a conventional active matrix substrate.

As shown in FIG. 18, under the condition that a data line driving circuit 2 is operating, inspecting pulse signals having alternate waveforms are input to two inspecting signal input terminals $S_1$ and $S_2$. In a case where the data line driving circuit 2 properly operates and no breakage or leakage occurs on the data lines $X_j$, pulses signals are output from three video signal input terminals $Q_1$, $Q_2$, and $Q_3$, as shown in FIG. 18. In another case, for example, where a signal is not properly output from the fourth terminal $XX_4$ of a shift register 2c, where the corresponding analog switch 2b is not turned on, or where a breakage of data line $X_4$ occurs, the output signal of the video signal input terminal $Q_1$ has an abnormal waveform, as shown in FIG. 19. When a signal output from the fourth terminal $XX_4$ of the shift register 2c is always at a High level, or when the fourth analog switch 2b is always in the on state, the waveform of the output signal of the video signal input terminal $Q_1$ is the same as that of the inspecting signal input to the inspecting signal input terminal $S_1$, as shown in FIG. 20, and proved to be abnormal.

Accordingly, in this example, the adjacent data lines $X_j$ can reliably and separately be inspected.

In the above-described examples, the data signal and scanning signal inspecting lines can be formed by patterning a polysilicon film or an Al film in the same manner as the formation of data lines or scanning lines.

During the data signal inspection, a data line driving circuit is made to operate. An inspecting signal is sent to an inspecting lines, and the data line driving circuit and data lines are inspected, based on a signal output from a video line. Specifically, the data line driving circuit turns on and off analog switches in accordance with a predetermined timing so that each of the data lines is sequentially connected to a video line. As a result, a signal based on the input inspecting signal is output from the video line. If the data line driving circuit cannot properly turn on and off the analog switches, or if there occurs a breakage or leakage in any of the data lines, the signal output from the video line has an abnormal waveform. Therefore, a fault of an active matrix substrate can be found. Through the adjacent ones of the data lines, different inspecting signals are fed, because a plurality of video lines are alternately connected to the data lines or because two data signal inspecting lines are alternately connected to the data lines. Accordingly, the adjacent ones of the data lines can be separately inspected in an easy manner.

During the scanning signal inspection, a scanning line driving circuit is made to operate. The scanning line driving circuit sequentially sends a scanning signal to each of scanning lines. The scanning signals are sequentially output from two inspection lines alternately connected to the scanning lines. If the scanning line driving circuit does not properly produce a scanning signal, or if there occurs a breakage or leakage in any of the scanning lines, the scanning signal output from the inspection line has an abnormal waveform. Therefore, a fault of the active matrix substrate can be found. The scanning signals fed through the adjacent ones of the scanning lines are output from the two different inspecting lines. Accordingly, the adjacent ones of the scanning lines can be separately inspected in an easy manner.

After the inspection, the inspecting lines connected to the data lines and the scanning lines are removed in a mechanical cutting process after the inspection, for example, after combining the active matrix substrate with a counter substrate. Therefore, in the inspection, a plurality of data lines or scanning lines can be easily inspected by one or two inspecting lines, and after the inspection, the inspecting lines are reliably separated from these data lines or scanning lines.

As described above, according to the method of inspecting an active matrix substrate of the invention, a fault in a data line driving circuit or a scanning line driving circuit each having plural outputs, a fault in a plurality of data lines or scanning lines and the like can easily and reliably be inspected by using one or two inspecting lines.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method of inspecting a driver monolithic type active matrix liquid crystal substrate including a substrate on which is disposed a plurality of pixels arranged in a matrix, a plurality of scanning lines and data lines arranged generally orthogonally to one another for driving said pixels, one or more video lines, and a data line drive circuit for sequentially applying pulses to said plurality of data lines to selectively connect one end of each of said plurality of data lines to one of said video lines, said method comprising the steps of:

disposing one or more inspecting lines on said substrate, and connecting the other end of each of said plurality of data lines to one of said inspecting lines;

respectively providing inspecting signal input terminals to each of said inspecting lines for receiving an inspecting signal to be used for inspecting the substrate;

applying said inspecting signal to each of said inspecting lines in turn through said respective inspecting signal input terminals, with said data line drive circuit operating to selectively connect said data lines to said one or more video lines;

analyzing the signals output from said one or more video lines in accordance with said inspecting signals and the desired operation of said data line drive circuit to determine whether both said data lines and said data line drive circuit are functioning correctly; and cutting the inspecting lines from the data lines after inspecting the substrate so that said inspecting lines and said inspecting signal input terminals are removed from the inspected substrate.

2. A method of inspecting a driver monolithic type active matrix liquid crystal substrate including a substrate on which is disposed a plurality of pixels arranged in a matrix, a plurality of scanning lines and data lines arranged generally orthogonally to one another for driving said pixels, and a scanning line drive circuit for sequentially applying scanning pulses to one end of each of said plurality of scanning lines, said method comprising the steps of:

disposing at least two inspecting lines on said substrate and connecting the other end of each of said plurality of scanning lines to one of said inspecting lines such that adjacent scanning lines are connected to different inspecting lines;

respectively providing inspecting signal output terminals to each of said inspecting lines for outputting signals to be analyzed for inspecting the substrate;

sequentially applying a scanning pulse to each of said plurality of scanning lines by operating said scanning line drive circuit;

analyzing said signals output from said at least two inspecting lines through said respective inspecting signal output terminals in accordance with said scanning pulses and the desired operation of said scanning line drive circuit to determine whether both said scanning lines and said scanning line drive circuit are functioning correctly; and cutting the inspecting lines from the scanning lines after inspecting the substrate so that said inspecting lines and said inspecting signal output terminals are removed from the inspected substrate.

3. The method of claim 1, wherein said inspecting lines are disposed near the edge of the substrate.

4. The method of claim 1, wherein said inspecting signal is a square wave.

5. The method of claim 1, wherein said one or more inspecting lines includes at least two inspecting lines, and wherein adjacent data lines are connected to different inspecting lines.

6. The method of claim 2, wherein said inspecting lines are disposed near the edge of the substrate.

7. The method of claim 1, wherein said one or more video lines include at least two video lines, and wherein adjacent data lines are connected to different video lines.

8. The method of claim 1, wherein said one or more video lines include first and second video lines and said data lines are alternately connected to said first and second video lines.

9. The method of claim 1, wherein said data line drive circuit is provided along one side of the matrix of said pixels and said one or more inspecting lines are provided along the opposite side of the matrix of said pixels.

10. The method of claim 2, wherein said scanning line drive circuit is provided along one side of the matrix of said pixels and said at least two inspecting lines are provided along the opposite side of the matrix of said pixels.

11. The method of claim 1, wherein said one or more inspecting lines include a plurality of inspecting lines, and wherein each of said plurality of data lines disposed in parallel to each other are selectively connected to the respective inspecting lines in a cyclic manner.

12. The method of claim 1, wherein said one or more video lines include a plurality of video lines, and wherein each of said plurality of data lines disposed in parallel to each other are selectively connected to the respective video lines in a cyclic manner.

13. The method of claim 1, further comprising the step of disposing another group of a plurality of inspecting lines on the substrate, wherein each of said plurality of scanning lines disposed in parallel to each other are selectively connected to the respective inspecting lines of said another group in a cyclic manner.

14. The method of claim 2, wherein each of said plurality of scanning lines disposed in parallel to each other are selectively connected to the respective inspecting lines in a cyclic manner.

\* \* \* \* \*